United States Patent Office 2,960,657
Patented Nov. 15, 1960

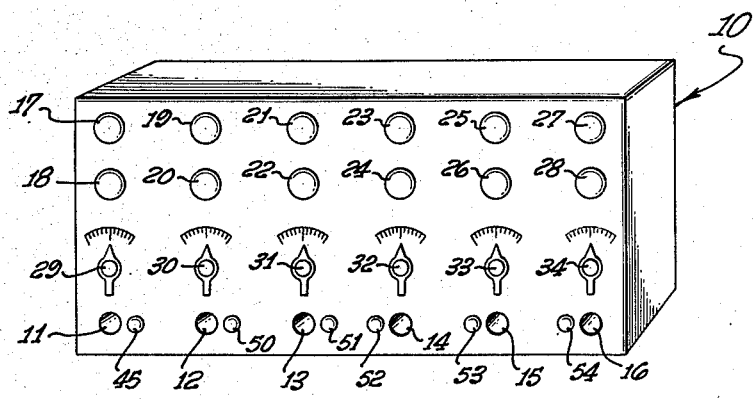
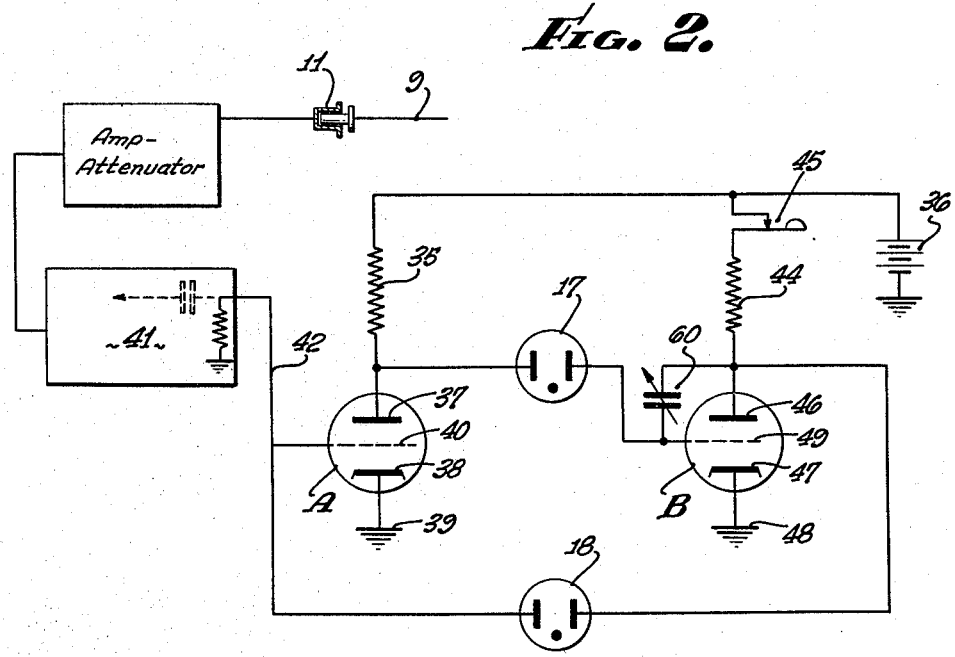

2,960,657

CIRCUIT MONITOR

Clement B. Edgerly, North Hollywood, Calif., assignor to Newcomb Electronics Corp., Los Angeles, Calif., a corporation of California Filed Apr. 8, 1957, Ser. No. 651,527

6 Claims. (Cl. 328—200)

This invention relates to electronic equipment, and particularly to the maintenance thereof.

One basic problem is to locate sources of trouble in electronic equipment. Location of a completely defective component in complex equipment, although perhaps tedious, is relatively simple. Attempting to locate a circuit or component that fails on y intermittently and at irregular intervals may obviously be most baffling and frustrating. When the cause of the trouble is sought, often no trouble exists. This frustrating behavior often is encountered. In some instances, intermittent failure may be undetected, and the function performed by the equipment may be unreliable, resulting often in a false sense of security.

The primary object of this invention is to provide novel apparatus for locating and recording the location of defective circuit or components, whereby the defective components or circuits cannot avoid detection by resuming operation.

Another object of this invention is to provide apparatus of this character for verifying reliable operation of equipment with which the apparatus is used.

Another object of this invention is to provide apparatus of this character that utilizes only a few electrical parts, wehreby assembly and maintenance of the e uip ment is simplified. For this purpose, the equipment permits use throughout of one type of electronic tube, one standard load circuit, and one standard type neon tube.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a pictorial view of apparatus incorporating the present invention; and Fig. 2 is a diagrammatic view showing a circuit for one of the stages.

The cabinet 10 houses the monitoring equipment. It provides a socket 11 cooperable with a plug forming the terminal of a probe lead 9 (Fig. 2). The probe lead is connected to an appropriate selected place in the electronic equipment to be tested or monitored.

If the desired signal voltage is transmitted by the probe lead to the socket 11, a neon tube 17 will be lit and a companion neon tube 18 will be dark, providing the signal continues to exist. If the signal fal's below a pre-set value, the neon tube 17 is extinguished and the neon tube 18 is lit. But even if the signal resumes, the neon tube 17 remains extinguished and the neon tube 18 remains lit, thereby indicating that there was at least a temporary failure.

Accordingly, a visual indication is given at any desired time as to whether or not an appropriate signal has continuously existed at a particular point in the electronic equipment.

Since it may be desirable or necessary to determine the operation of the electronic equipment at other points, a plurality of neon tube pairs and associated circuits and sockets is provided. The neon tube pairs 19—20, 21—22, 23—24, 25—26 and 27—28 are provided and operate with sockets 12 through 16.

The cabinet 10 thus includes, in this instance, six similar and separate stages. It is thus possible, by using the present structure, to use six probes for cooperation with six different reference points in an electronic circuit. Of course, as many stages can be provided as desired, and, if necessary from the standpoint of complexity of equipment, additional units 10 can be provided.

If the probes for the sockets 11 through 16 cooperate with successive portions of a circuit for electronic equipment, a simple visual indication is given of the exact point of failure. Thus, for example, if tubes 17, 19 and 21 are lit and the tubes 24, 26 and 28 are lit, it will immediately be apparent that signal failure exists or existed corresponding to that point of the circuit connected to the probe that cooperates with socket 14.

Since the desired voltages or electromotive forces existing at the places in the circuit under test may differ substantially, and since it is desirable to use identical circuits for each of the stages, the signal is boosted or attenuated, as may be required, in order to provide a uniform reference input value for each of the indicating circuits. For example, if the desired reference input value is one volt, and the corresponding signal desirably is ten volts, the signal intensity is proportionally divided by a factor of ten. If the signal desired is 0.1 volt, the signal intensity is multiplied by a factor of ten. This is accomplished by controls operated by knobs 29, 30, 31, 32, 33 and 34. These knobs may control amplifiers, potentiometers, or the like. For each use of the apparatus, the knobs are initially adjusted for calibration purposes.

The circuit for one of the neon tube pairs is illustrated in Fig. 2. This circuit is similar to all the other pairs. The circuit includes a pair of electronic emission tubes A and B which are, in the present instance, simple triodes. A resistor 35 is inserted between a source 36 of plate current and the plate 37 of the tube A. The cathode 38 is grounded as at 39 or suitably connected to the low potential side of the source 36. The signal appropriately boosted or attenuated by the amplifier-potentiometer arrangement is applied to the grid 40 of the tube A.

Part of a coupling circuit 41 is illustrated in Fig. 2. A lead 42 is provided between the coupling circuit and the grid 40. Under the influence of an alternating voltage on the grid 40, the direct current potential of the plate cycles about its equlibrium potential, which corresponds to the potential attained when no signal is received. The variation in direct current voltage at the plate 37 controls the neon tube 17 or other suitable tube. For this purpose, the tube 17 is connected to the plate 37. In the absence of signal on the grid 40, the non-varying equilibrium potential of the plate 37 is insufficient to cause conduction of the neon tube 17.

During the negative swing of the grid 40 under the influence of the input, the direct current voltage at the plate 37 increases due to redistribution of voltage between the tube A and the load resistor 35. The increased voltage of the plate 37 causes the tube 17 to fire.

During the positive swing of the grid 40, the plate voltage decreases relative to its equilibrium value, but this is of no consequence since the periodic existence of sufficient voltage creates a desired indication, cycling with the signal frequency.

Should the signal on the grid 40 disappear or be reduced by a significant amount, the plate voltage 37 will not rise significantly above its equilibrium voltage and the tube 17 will not conduct at all. The attenuation of signal necessary to cause the neon tube 17 to extinguish depends upon the characteristics of the tube A, the actual value of the reference input, the firing potential of the tube 17, the potential delivered by the source 36, and the value of the resistor 35. Quite obviously, by appropriate design, the tube 17 may be made to extinguish when the signal voltage drops one-half or any other fraction of its intended value.

As hereinafter explained, neon tube 17 will not relight once the signal has failed, until manually reset.

The tube B has a load circuit including a resistor 44 and a reset or interrupter switch 45, to be described hereinafter.

The plate 46 of the tube B has an equilibrium voltage, and the cathode 47 is grounded as indicated at 48. The grid 49 of the tube B is influenced by the neon tube 17. In the present instance, the neon tube 17 is directly connected between the grid 49 of tube B and the plate 37 of the tube A for this purpose.

When the neon tube 17 conducts, almost the entire voltage at the plate 37 of tube A is applied to the grid 49 of the tube B, the voltage drop of the neon tube being relatively small. The circuit for the current to sustain operation of the neon tube 17 is completed through the grid 49 and the cathode 47. When the grid 49 is positive, that is, whenever neon tube 17 conducts, the tube B conducts heavily. The voltage at its plate 46 is reduced significantly below its equilibrium value.

The second neon tube 18 is connected to the plate 46 of the tube B, and when the potential of the plate 46 is reduced due to heavy conduction, the voltage is insufficient to fire the neon tube 18. However, should the neon tube 17 become extinguished due to failure of the signal, the voltage at the plate 46 rises to its equilibrium value. When the plate 46 is at its equilibrium value, the neon tube 18 fires. Accordingly, on failure of the signal, the neon tube 17 is extinguished and the neon tube 18 is lit. However, if the signal exists continuously, the neon tube 17 is lit and the neon tube 18 is extinguished.

If the neon tube 18 were connected directly between the plate 46 and ground, failure of signal followed by resumption of signal (due to vagaries of circuit components, for example) would result in neon tube 17 again being lit, and the neon tube 18 being again extinguished. In this event, unless the apparatus is constantly observed, it will be impossible to determine that there was an intermittent failure. Even if failure were noted in another manner, it would be impossible to know where the failure occurred. Thus, for example, in a complex computer or the like, entirely unreliable results may be obtained due to instantaneous failure of one of the circuit components.

In order to provide a lasting indication of past failure as well as present failure, the neon tube 18 triggers operation of the tube A such that resumption of the signal will be ineffective to cause the neon tube 17 to fire. For this purpose, the neon tube 18 is connected between the plate 46 of the tube B and the grid 40 of the tube A.

Upon initial failure of the signal, the tube 18 conducts and a relatively high positive voltage is applied to the grid 40. The voltage so applied significantly exceeds the maximum negative value of the reference signal input. Thus, when the neon tube 18 conducts, the voltage of the plate 37 drops far below the firing potential of the neon tube 17. Should the signal resume, the negative swing of the signal is ineffective to raise the plate potential above the firing potential of the neon tube 17. Thus, the signal no longer controls operation of the neon tube 17. Should a signal cease to exist for any instant of time, the tube 17 will be dark and the tube 18 will be lit even if the signal resumes.

By utilizing this device, it is possible to verify continuous operation of a circuit, where continuous operation is crucial.

The circuit accordingly pinpoints faulty equipment, and the section in which the faulty equipment is located is removed and another circuit substituted if the source of trouble is not otherwise readily located.

In order to restore control of the circuit to the signal voltage, the reset switch 45 is provided. The reset switch 45, which is in the load circuit for the plate B, cuts off the application of voltage to the plate 46 and the neon tube 18. The neon tube 18 accordingly ceases to conduct and the grid 40 and tube A may once again be brought under the control of the signal voltage.

The reset switch 45 may, if desired, be made common to all of the load circuits for the tubes B of each of the circuits. Optionally, separate reset switches 50, 51, 52, 53 and 54 may be provided. These switches, as well as the switch 45, are conveniently located adjacent the corresponding sockets for the probes (Fig. 1).

Before monitoring is initiated, the equipment under test must be given an opportunity to warm up. Thereafter, the reset switches 45, etc. can be operated. A warm-up period ensures against premature firing of the neon tube 18.

Obviously, by using an appropriate input circuit, the existence of a direct current potential can be sensed in the same manner as an alternating circuit voltage.

The neon tube 17, with an alternating current signal on grid 40, pulsates. If the frequency of the signal is small, the lulls between pulsations may permit the voltage at the plate 46 of the tube B to rise above the firing potential of the neon tube 18. To prevent this false indication, a small capacitor 60 is inserted between the plate 46 and the grid 49. The capacitor is made large enough to smooth the pulsations, thereby preventing a quick drop in grid voltage. The charge on the capacitor 60 introduces a time delay between extinguishing of neon tube 17 due to signal failure and firing of neon tube 18. This ensures against false indications should the line voltage to the equipment under test be momentarily reduced, as by starting motors. The capacitors should, however, be small enough to ensure proper operation of the system, i.e., to energize tube 18, should the signal fail for a somewhat longer period.

If the neon tubes 17 and 18 have identical specifications, and if the neon tube 18 is to be lit and the neon tube 17 is to be dark when no voltage is applied to the grid of tube A, either the equilibrium plate voltage at tube B must be greater than the equilibrium plate voltage of tube A or there must be less resistance in the energization circuit of the neon tube 18 as compared with that in the energization circuit of the neon tube 17.

The equilibrium plate voltages may be caused to differ by choosing different supply voltages, different load resistors or even by using electronic emission tubes of different specifications. Any of these solutions is obviously undesirable. However, the equilibrium plate voltages differ even though the tubes A and B, their supply voltages and their load resistors are identical. This follows since the grid of the tube B develops a substantial contact potential, whereas the grid of tube A develops a less significant contact potential since it has a relatively low grid leak path through the input circuit.

In any event, the circuit for the neon tube 17 is completed only through the grid of tube B, whereas the circuit for the neon tube 18 is completed not only through the grid of tube A, but also through the input circuit. Hence, the circuit resistance for the neon tube 18 is less than that for the neon tube 17. Hence, for cumulative reasons, the desired operation of the neon tubes 17 and 18 is achieved without using different neon or electronic tubes, different load circuits or different supply voltages.

The inventor claims:

1. In a symmetrical on-off circuit: a pair of electronic devices each having a control electrode and a pair of output electrodes; glow tubes connected between corresponding output electrodes of the respective devices and the control electrodes of the companion devices; load circuit means for the respective devices; an input circuit cooperable with the control electrode of one of said devices; said input circuit, and only upon existence of a signal of predetermined value, causing the voltage across said one device to rise and causing the firing of that one glow tube connected to the output electrode of said one device; firing of said one glow tube causing the voltage across the second device to be reduced by increased conduction, and causing said second glow tube to be extinguished; said second glow tube being fired upon increase in the voltage across said second device and caused by the said first glow tube being extinguished; the firing of said second glow tube increasing the conduction of said first device precluding firing of said first tube even upon resumption of said predetermined signal and circuit means for smoothing pulsations at the control electrode of said second device.

2. The combination as set forth in claim 1 in which the circuits for the respective devices and the glow tubes are alike, the input circuit determining a leakage path whereby in the absence of signal, said one glow tube is extinguished and said second glow tube is fired.

3. A circuit monitor for indicating the failure of an alternating current signal: a pair of variable electronic devices each having electrodes adapted to connect with a load circuit and also having a control electrode; means forming load circuits for each of said devices; means for exciting said load circuit; an electronic discharge element connected between a point in the load circuit of one device and the control electrode of the other device, said electronic discharge element requiring the application of a predetermined potential for firing; means for applying the signal to be monitored to the control electrode of said one device; the load circuit for said one device being so characterized that the equilibrium potential of said point is ineffective to cause said discharge element to fire, said discharge element firing in response to swings in one direction of the monitored signal; means for steadying the pulsations at the control electrode of the other device; and means operated in response to cessation of ocnduction of said discharge element, and by the aid of the second device for imposing a bias on the control electrode of the first device to prevent the monitored signal, upon resumption, from causing said discharge element to fire; and reset means for restoring first electronic device for control by the monitored signal.

4. The combination as set forth in claim 3 in which said discharge element gives a visual indication of its conducitve state.

5. The combination as set forth in claim 3 in which said bias imposing means comprises a second electronic discharge element connected between a point in the load circuit for the second device and the control electrode of said first device, the potential of said last named point rising to a value sufficient to fire said second discharge element only upon cessation of conduction of said first named discharge element.

6. The combination as set forth in claim 3 in which said bias imposing means comprises a second electronic discharge element connected between a point in the load circuit for the second device and the control electrode of said first device, the potential of said last named point rising to a value sufficient to fire said second discharge element only upon cessation of conduction of said first named discharge element; said electronic discharge elements both being of a type giving visual indication of conduction.

References Cited in the file of this patent

UNITED STATES PATENTS 2,589,465     Weiner _____ Mar. 18, 1952